United States Patent [19]

Giglia

[11] E Re. 30,835

[45] Reissued Dec. 29, 1981

[54] SELF-SUPPORTING PIGMENT LAYERS FOR ELECTROCHROMIC DISPLAY

[75] Inventor: Robert D. Giglia, Rye, N.Y.

[73] Assignee: American Cyanamid Company, Stamford, Conn.

[21] Appl. No.: 736,022

[22] Filed: Oct. 27, 1976

Related U.S. Patent Documents

Reissue of:

[64] Patent No.: 3,892,472
Issued: Jul. 1, 1975
Appl. No.: 428,563
Filed: Dec. 26, 1973

[51] Int. Cl.[3] ..... G02F 1/17

[52] U.S. Cl. ..... 350/357

[58] Field of Search ..... 350/357

[56] References Cited

U.S. PATENT DOCUMENTS

| | | | |
|---|---|---|---|
| 3,560,078 | 2/1971 | McIntyre et al. | 350/357 |
| 3,578,843 | 5/1971 | Castellion | 350/357 |
| 3,712,710 | 1/1973 | Castellion et al. | 350/357 |
| 3,807,832 | 4/1974 | Castellion | 350/357 |

*Primary Examiner*—William L. Sikes
*Attorney, Agent, or Firm*—Robert J. Feltovic; Gordon L. Hart

[57] ABSTRACT

An electrochromic data display and imaging device which may be formed by sandwich arrangement of the imaging area and the counter-electrode area, with a suitable self-supporting ion-conductive layer between.

13 Claims, 4 Drawing Figures

SELF-SUPPORTING PIGMENT LAYERS FOR ELECTROCHROMIC DISPLAY

Matter enclosed in heavy brackets [ ] appears in the original patent but forms no part of this reissue specification; matter printed in italics indicates the additions made by reissue.

BACKGROUND OF THE INVENTION

This invention relates to electro-optical devices whose electromagnetic radiation absorption characteristics can be selectively altered by influence of a suitably controlled electric field. More particularly, this invention is directed to a sandwich type cell in which two layers of electrochromic material are separated by a self-supporting ion conducting medium.

In commonly assigned, copending U.S. applications, Ser. No. 41,153 *now abandoned,* Ser. No. 41,154 *now abandoned* and Ser. No. 41,155 *now U.S. Pat. 3,708,220,* all filed May 25, 1970, and U.S. Pat. Nos. 3,521,941 and 3,578,843[; Ser. No. 41,153, abandoned and refiled as Ser. No. 211,857, Dec. 23, 1971, abandoned and refiled as Ser. No. 361,760, May 18, 1973, now copending; Ser. No. 41,154, abandoned and refiled, now pending; Ser. No. 41,155, now U.S. Pat. No. 3,708,220;], there are described electro-optical devices exhibiting a phenomenon known as persistent electrochromism wherein electromagnetic radiation absorption characteristic of a persistent electrochromic (EC) material is altered under the influence of an electric field. Such devices were employed in sandwich arrangement between two electrodes. Coloration was induced by charging the electrochromic film negative with respect to the counter-electrode, employing an external potential. The counter-electrode can be the same as the persistent electrochromic material or different.

By reversing the original polarity of the field or by applying a new field, it was also possible to cancel, erase or bleach the visible coloration.

These steps of color induction and erasure are defined as cycling.

The devices described in the prior applications are effective to change their electromagnetic radiation transmitting properties under the influence of an electric field, and have extremely good visibility over a wide range of lighting conditions, including high ambient light. However, these EC displays normally feature a light color background which consists of a thin layer of pigment mixed with a liquid electrolyte to form an ion conducting layer. This layer serves to hide the black counter-electrode and to provide good contrast with the blue-black EC film. It has been found that EC displays when stored for long periods of time, especially when stored on edge, develop a problem of separation of the pigment background. This appears as a black crack in the light background due to the carbon counter-electrode showing through. Efforts to cope with this problem by providing thickened, gel-like electrolyte pastes resulted in slowing the switching speed as the thickened electrolyte reduced the mobility of ions between the electrodes.

It is, therefore, an object of this invention to provide an ion-conducting medium having a color pigment incorporated which will retain a homogeneous consistency under varying physical conditions, over a long period of time.

This and other objects of the invention will become apparent as the description thereof proceeds.

SUMMARY OF THE INVENTION

The image display device is formed in a sandwich arrangement of an electrochromic layer as an imaging area and a counter-electrode with a spacing of an ion-conducting medium, e.g. an electrolyte, between the areas. Means are provided for supplying electric current to the counter-electrode layer. Any conventional means is suitable. A particularly advantageous means for electrical connection is to deposit the electrochromic imaging layer and counter-electrode on a conductive surface, such as NESA glass. It is particularly advantageous to incorporate a pigment material with the electrolyte for greater contrast and for masking the counter-electrode.

The present invention discloses methods of preventing the pigment from separating in one area and compacting in another by binding the pigment in a self-supporting structure. Another advantage provided is that the self-supporting pigment structure acts as a separator preventing electrical shorting of the EC and counter-electrodes. The methods used to prepare the pigment layer result in porous structures which do not restrict ion flow and thereby maintain good switching speed.

DETAILED DESCRIPTION OF INVENTION

As used herein, a "persistent electrochromic material" is defined as a material responsive to the application of an electric field of a given polarity to change from a first presistent state in which it is essentially non-absorptive of electromagnetic radiation in a given wavelength region, to a second persistent state in which it is absorptive of electromagnetic radiation in the given wavelength region, and once in said second state, is responsive to the application of an electric field of the opposite polarity to return to its first state. Certain of such materials can also be responsive to a short circuiting condition, in the absence of an electric field so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

Electrochromic Material

The materials which form the electrochromic materials of the device in general are electrical insulators or semiconductors. Thus are excluded those metals, metal alloys, and other metal-containing compounds which are relatively good electrical conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition methalides, selenides, tellurides, chromates, molybdates, tungstates, vanadates, niobates, tantalates, titanates, stannates, and the like. Particularly preferred are films of metal stannates, oxides and sulfides of the metals of Group (IV)B, (V)B and (VI)B of the Period System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides, e.g. MnO, NiO, CoO, etc.; $M_2O_3$ oxides, e.g., $Cr_2O_3$, $Fe_2O_3$, $Y_2O_3$, $Yb_2O_3$, $V_2O_3$, $Ti_2O_3$, $Mn_2O_3$, etc.; $MO_2$ oxides, e.g., $TiO_2$, $MnO_2$, $ThO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$ etc., $Nb_2O_5$, $Ta_2O_5$ etc.; $M_4O_6$ oxides; $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$("Niobite" oxides); $X_2Y_2O_6$, e.g., $Na_2Nb_2O_6$: Spinel structure oxides, i.e., of the formula $X_2YO_4$, e.g., $Na_2MoO_4$, $NaWO_4$, $Ag_2MoO_4$, $Cu_2MoO_4$, $Li_2MoO_4$, $Li_2WO_4$, $Sr_2TiO_4$, $Ca_2MnO_4$, etc.; $XY_2O_4$, e.g., $FeCr_2O_4$, $TiZn_2O_4$, etc.; $X_2YO_5$ oxides, e.g., $Fe_2TiO_5$, $Al_2TiO_5$, etc.; and $X_3Y_3O$ (ternary) oxides, e.g., $Mo_3Fe_3O$, $W_3Fe_3O$, $X_3Ti_3O$ (where X is Mn, Fe, Co, etc.). For a discussion of some complex oxides, see Advanced Inorganic Chemistry, Cotten and Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3.H_2O$, $WO_3.2H_2O$, $MoO_3.H_2O$ and $MoO_3.2H_2O$.

A particularly advantageous aspect in the present invention is the use of two separate layers of identical electrochromic materials one layer being employed in the counterelectrode for the other layer. A preferred embodiment consists of tungsten oxide as the electrochromic color electrode and tungsten oxide and graphite as the counter-electrode.

While the general mechanism of persistent electrochromism is unknown, the coloration is observed to occur at the negatively charged electrochromic layer. Generally, the phenomenon of persistent electrochromism is believed to involve cation transport such as hydrogen or lithium ions to the negative electrode where color centers form in the electrochromic image layer as a result of charge compensating electron flow.

When the persistent electrochromic materials are employed as films, thickness desirably will be in the range of from about 0.1-100 microns. However, since a small potential will provide an enormous field strength across very thin films the latter, i.e., 0.1-10 microns, are preferred over thicker ones. Optimum thickness will also be determined by the nature of the particular compound being laid down as a film and by the film-forming method since the particular compound and film-forming method may place physical (e.g., non-uniform film surface) and economic limitations on manufacture of the devices.

The films may be laid down on any substrate which, relative to the film, is electrically conducting. The electrically conductive material may be coated on another suitable substrate material including glass, wood, paper, plastics, plaster, and the like, including transparent, translucent, opaque or other optical quality materials. A preferred embodiment in the instant device would employ at least one transparent electrode.

When tungsten oxide is employed as the electrochromic imaging material and an electric field is applied between the electrodes, a blue coloration of the previously transparent electrochromic layer occurs, i.e., the presistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially non-absorbent and thus transparent.

Counter Electrode

As previously indicated, the counter-electrode may be any electrically conductive material. Particularly advantageous is a layer of electrochromic material, as described previously. It is also advantageous to use the same electrochromic material for the imaging area and counter-electrode. A mixture of graphite and an electrochromic material, or graphite alone may be used as the counter-electrode. Other metallic counter-electrodes are disclosed in copending application, Ser. No. 41,154.

The invention may be further understood by reference to the drawings in which

Figure 1:
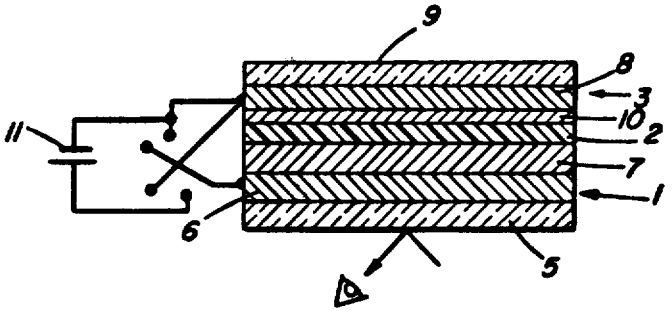
FIG. 1 is a cross section of the electrochromic display device.

As shown in FIG. 1, a conventional EC information display having transparent EC electrode 1, light colored, pigmented ion conducting medium layer 2 and opaque counter-electrode 3. Layer 2 may be a porous self-supporting layer incorporating a pigment, or other desired materials, and soaked in an electrolyte, e.g. sulfuric acid, or the like as disclosed in commonly assigned application Ser. No. 41,154, filed May 25, 1970. The EC electrode 1 forms the viewing surface and has a transparent or translucent substrate 5, e.g. glass, with a conductive layer 6, e.g. tin oxide, and an electrochromic layer 7. The counter-electrode 3 is also a composite of a conductive layer 8 on a substrate 9, and a counter-electrode material 10 such as carbon, tungsten oxide, or a mixture thereof. A suitable substrate for the viewing area and counter-electrode is NESA glass, which is glass having a thin transparent layer of tin oxide.

When battery 11 is connected to make counter-electrode 3 negative, EC electrode layer 7 colors. When the connections are reversed, EC layer 7 erases (or bleaches).

Figure 2:
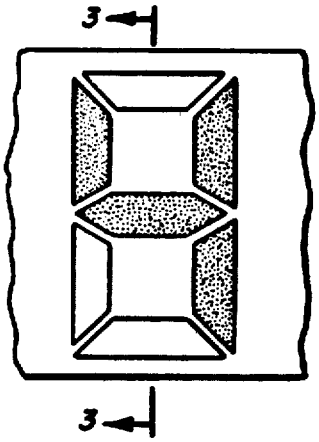
FIG. 2 is a front view of a single digital segment in an electrochromic digital display.
Figure 3:
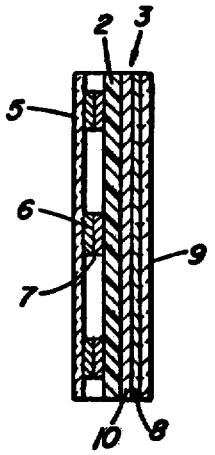
FIG. 3 is a cross sectional view of the segment of FIG. 2, taken along the lines A—A.
Figure 4:
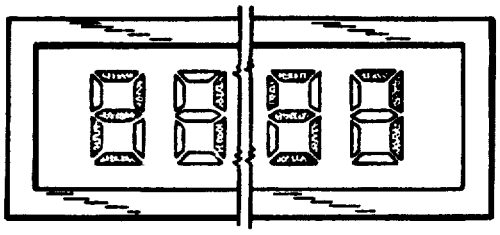
FIG. 4 is a front view of a linear digital display according to the invention.

In FIGS. 2, 3 and 4 are shown electrochromic devices with the EC layer 7 in the form of a plurality of segments which may be selectively activated to show numbers. FIG. 2 shows the number 4.

The invention should be usefully applied in EC displays for watches, clocks, calculators, telephone displays, automotive dashboards, instrument indicators and advertising displays.

EXAMPLE 1

Method For Preparing A Counter-Electrode

A counter-electrode was prepared as follows: Dixon Crucible Co. Graphokote No. 120 was brushed on a clean substrate on NESA glass. While the Graphokote 120 film was still wet, $WO_3$ powder was sprinkled onto the surface. Air drying for ½ hour at 25° C. and baking at 300° C. for ½ hour followed. The $WO_3$ particles became embedded in the graphite film as the electrode was air dried at 25° C. The electrode was cooled to 25° C. and soaked in a solution of glycerin-sulfuric acid 10:1 by volume for 24 hours minimum, rinsed with acetone and baked at 90° C. for ½ hour to dry. The resulting deposit was composed of approximately 0.5 $gm/cm^2 WO_3$ on 2.0 $mg./cm^2$ Graphokote 120.

EXAMPLE 2

Method For Preparing Pigmented Spacing Ion-Conducting Layers

Type I pigment layers employ adhesive binders to hold the pigment powder in a self-supporting, porous film. Examples of Type I are: (a) Mix the ratio 1 gm of Sun Yellow C pigment to 1 cc part A and 1 cc part B Peterson Clear Epoxy with 1 cc Peterson Epoxy Thinner. The mix is sprayed onto Teflon sheet, cured for 1 hour at 65° C. and stripped from the Teflon film. The pigmented film. The pigmented film can be cut to size for insertion into the EC device. (b) Beginning with Rohm and Haas Latex AC-34, mix 1 part to 9 parts (by volume) water. Add 1.5 cc of this mix to 1 gram of Sun Yellow C pigment and brush onto a microporous polypropylene film, Celanese Plastics Company Celgard No. 2400 W. Room temperature dry for ½ hour then bake at 60° C. for 15 minutes. Cut the pigment on polypropylene film to size and assemble into the device.

Type II pigment layers feature a non-adhesive method of bonding of the pigment particles into a self-supporting layer. In one example 20 grams of $BaSO_4$ powder was mixed with a dispersion containing 2 grams solids of Dupont TFE Dispersion 30B and water. The loose mix was blended in a Waring Blender for several minutes and heated in an oven at 120° C. to drive off the water. Ten grams of glycerin was added and stirred into the mix. The mix was placed between sheets of Teflon film and squeezed to a thin film in a power roll. This rolling operation fibrillates the Teflon 30B and traps the pigment in the structure. The rolled film was stripped from the Teflon sheets and the glycerin was extracted in an overnight water wash leaving a porous pigment film. The film was over dried and cut to size for assembly into an EC display.

Type III pigment layers are prepared by the paper-making process. In one example 3 grams of $BaSO_4$ powder, 3 grams of Sun Yellow C pigment and 1 gram (solids) of acrylic fiber pulp were mixed with 300 cc of water and blended for 15 seconds. One cc of Cyanamid M560C flocculant was hand stirred into the mix until the water cleared. The sheet was formed using a common 6 inch diameter, paper-making machine. The sheet was roll sized and dried on a rotating drum drier for 1 minute at 120° C. A sheet 0.015 inch thick resulted which could be cut and assembled into an EC display.

EXAMPLE 3

An electrochromic device was constructed from two NESA glass plates. One conductive NESA plate was coated with a 0.5 micron thick evaporated film of tungsten oxide. The other NESA plate was a counter-electrode as in Example 1. The glass plate so formed were pressed together with the electrochromic and graphite films facing each other but separated by a spacing layer as described in Example 2, the layer having been saturated with a 1:10 ratio of concentrated sulfuric acid and glycerin. This device was cycled from color to clear and back to color at an applied potential of 1.1 volts D.C. with half cycles of 100 milliseconds. The device underwent 5,000,000 cycles of switching at 60 cycles per minute without observable deterioration.

Previous methods attempting to correct the pigment separation problem resulted in slowing the switching speed. This invention eliminates the problem without slowing the switching speed of the display. The invention also makes possible a variety of cosmetic effects not previously possible, allowing for improvements in appearance of these background films. For example, the good insulating properties of these films may permit the addition of reflecting metal particles to add "sparkle" to the display background.

The invention is expected to be useful in applications which include information displays, indicators and others where the display is used in the reflective mode. It is particularly useful in applications involving large area display or applications in which shock and vibration is present, such as in automobile dashboard displays, and the like.

I claim:

1. A varaible light transmission device which comprises light transmitting substrate having a persistent electrochromic material as a light modulating material, a counter-electrode, and a [self-supporting] *porous separator* layer comprising a pigment and an ion-conducting material *in a binding medium* in contact with said *light modulating* material and counter-electrode.

2. A variable light transmission device as in claim 1, which comprises two layers, one with said electrochromic material, and the other of said counter-electrode separated by said [self-supporting] *porous separator* layer, disposed between a pair of conductive electrodes.

3. The device of claim 2, wherein said counter-electrode is the type of the persistent electrochromic material.

4. The device of claim 3, wherein the electrochromic materials in each said layer are identical.

5. The device of claim 2, wherein at least one of the electrodes is substantially transparent.

6. The device of claim 4, wherein said electrochromic materials are $WO_3$.

7. A device of claim 1, wherein said [self-supporting] *porous separator* layer contains a color pigment.

8. The device of claim 1, wherein said [self-supporting] *porous separator* layer is a porous sheet saturated with an electrolyte.

*9. The device of claim 1 wherein said porous separator layer is self-supporting.*

*10. The device of claim 9 wherein the self-supporting porous layer is a separate pre-cut element.*

*11. In an electrochromic display of the type having a first substrate with selectively actuatable transparent electrodes and first electrochromic layers thereon, and also having a*

*second substrate with counter-electrode and second electrochromic layer thereon, the improvement comprising:*

*porous separator means applied as a layer and uniformly and closely spacing said first and second substrate members, the pores of said separator means being filled with liquid electrolyte, and*

*pigment means held by said separator means and selected to provide contrast with said first electrochromic*

*layers and disposed to hide said second electrochromic layer.*

*12. The combination according to claim 11, wherein said porous separator means comprises porous polypropylene.*

*13. The combination according to claim 11, wherein said pigment means is premixed in said separator means.*

* * * * *